United States Patent
Shin et al.

(10) Patent No.: US 12,306,761 B2
(45) Date of Patent: May 20, 2025

(54) STORAGE MODULE SUPPORTING PREFETCH FUNCTION AND OPERATION METHOD THEREOF

(71) Applicant: Samsung Electronics Co., Ltd., Suwon-si (KR)

(72) Inventors: Wonjae Shin, Suwon-si (KR); Doohwan Oh, Suwon-si (KR); Ilwoong Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/139,112

(22) Filed: Apr. 25, 2023

(65) Prior Publication Data

US 2024/0020235 A1 Jan. 18, 2024

(30) Foreign Application Priority Data

Jul. 14, 2022 (KR) .................. 10-2022-0087189

(51) Int. Cl.
G06F 12/00 (2006.01)
G06F 12/0844 (2016.01)
G06F 12/0862 (2016.01)

(52) U.S. Cl.
CPC ...... *G06F 12/0862* (2013.01); *G06F 12/0844* (2013.01); *G06F 2212/6026* (2013.01)

(58) Field of Classification Search
CPC .................. G06F 12/0844; G06F 12/0862
USPC ........................................ 711/137
See application file for complete search history.

(56) References Cited

U.S. PATENT DOCUMENTS

| 5,809,560 A * | 9/1998 | Schneider ........... G06F 12/0862 |
| | | 711/204 |
| 5,835,443 A | 11/1998 | Fujita |
| 5,892,730 A | 4/1999 | Sato et al. |
| 8,806,071 B2 | 8/2014 | Zitlaw |
| 11,010,092 B2 | 5/2021 | Hasbun et al. |
| 11,200,930 B1 * | 12/2021 | Valsala .................... G11C 7/04 |
| 2003/0093608 A1 * | 5/2003 | Jaramillo ............ G06F 13/4059 |
| | | 710/310 |
| 2003/0126414 A1 * | 7/2003 | Grochowski ......... G06F 9/3861 |
| | | 712/225 |
| 2012/0185651 A1 * | 7/2012 | Kimori ............... G06F 12/0862 |
| | | 711/137 |
| 2013/0191558 A1 | 7/2013 | Zitlaw |

(Continued)

FOREIGN PATENT DOCUMENTS

| EP | 3 637 265 A1 | 4/2020 |
| JP | 2003-345649 A | 12/2003 |
| KR | 10-2005-0089117 A | 9/2005 |

OTHER PUBLICATIONS

Proposed DDR4 Full spec update(79-4C), JEDEC Committee Letter Ballot, Committee meeting in Jun. 2018, Committee: JC42.3C, Committee Item No. 1716.78D, 258 Pages.

(Continued)

*Primary Examiner* — Mohamed M Gebril
(74) *Attorney, Agent, or Firm* — Sughrue Mion, PLLC

(57) ABSTRACT

A method of operating the storage module includes setting a characteristic value based on information on a prefetch size received from a host, and performing consecutive read operations in units of cache lines based on one prefetch read command received from the host.

18 Claims, 23 Drawing Sheets

(56) References Cited

U.S. PATENT DOCUMENTS

| | | | |
|---|---|---|---|
| 2013/0268715 A1* | 10/2013 | Fetterman | G06F 9/3888 |
| | | | 711/E12.078 |
| 2016/0092383 A1 | 3/2016 | Bains et al. | |
| 2016/0378366 A1* | 12/2016 | Tomishima | G11C 8/12 |
| | | | 711/154 |
| 2017/0083441 A1* | 3/2017 | Cheng | G06F 12/0842 |
| 2018/0276149 A1 | 9/2018 | Bains | |
| 2018/0357009 A1 | 12/2018 | Ikarashi | |
| 2018/0358063 A1* | 12/2018 | Chen | G11C 8/10 |
| 2019/0138245 A1 | 5/2019 | Shin et al. | |
| 2019/0347040 A1 | 11/2019 | Hasbun et al. | |
| 2020/0110705 A1* | 4/2020 | Jo | G06F 12/0877 |
| 2021/0365376 A1* | 11/2021 | Roberts | G06F 12/0815 |
| 2022/0187988 A1 | 6/2022 | Gans et al. | |
| 2022/0206803 A1* | 6/2022 | Chen | G06F 9/30127 |
| 2023/0178138 A1* | 6/2023 | Nygren | G06F 1/10 |
| | | | 365/233.1 |
| 2023/0325090 A1* | 10/2023 | Feld | G06F 3/0619 |
| | | | 711/137 |
| 2024/0020234 A1* | 1/2024 | Oh | G06F 12/0842 |
| 2024/0020235 A1* | 1/2024 | Shin | G06F 12/0844 |

OTHER PUBLICATIONS

Taek Woon Kim, DDR5 Full Spec Draft Rev1.81, JEDEC Committee Letter Ballot, Committee: JC42.3, Committee Item No. 1848.99M, Aug. 2011, 502 Pages.

Communication issued Dec. 19, 2023 by the European Patent Office in counterpart to European Patent Application No. 23184639.5.

* cited by examiner

FIG. 8A

MRS (DDR4)

| Function | Previous Cycle | | CS_n | ACT_n | RAS_n /A16 | CAS_n /A15 | WE_n /A14 |
|---|---|---|---|---|---|---|---|
| | Previous Cycle | Current Cycle | | | | | |
| | BG0-BG1 | BA0-BA1 | C2-C0 | A12/BC_n | A17, A13, A11 | A10/AP | A0-A9 |
| MRS | BG | BA | V | \<-------- OP Code --------\> | | | |
| | H | H | L | H | L | L | L |

FIG. 8B

MRW (DDR5)

| Function | CS_n | CA Pins | | | | | | | |
|---|---|---|---|---|---|---|---|---|---|
| | | CA0 | CA1 | CA2 | CA3 | CA4 | CA5 | CA6 | |
| MRW | L | H | L | H | L | L | MRA0 | MRA1 | |
| | | CA7 | CA8 | CA9 | CA10 | CA11 | CA12 | CA13 | |
| | | MRA2 | MRA3 | MRA4 | MRA5 | MRA6 | CA12 | CA13 | |
| | | | | MRA7 | | | | V | |
| | CS_n | CA Pins | | | | | | | |
| | | CA0 | CA1 | CA2 | CA3 | CA4 | CA5 | CA6 | |
| | H | OP0 | OP1 | OP2 | OP3 | OP4 | OP5 | OP6 | |
| | | CA7 | CA8 | CA9 | CA10 | CA11 | CA12 | CA13 | |
| | | OP7 | V | V | CW | V | V | V | |

FIG. 8C

MRS or MRW

| Function | Register Type | Operand | Data | |
|---|---|---|---|---|
| Cache Line Prefetch Size (64byte*n) | R or R/W | OP[3:0] (4bit) | 0000 | 1 CL |
| | | | 0001 | 2 CL |
| | | | 0010 | 3 CL |
| | | | 0011 | 4 CL |
| | | | 0100 | 5 CL |
| | | | ⋮ | ⋮ |
| | | | 1110 | 15 CL |
| | | | 1111 | 16 CL |

| Function | Register Type | Operand | Data | |
|---|---|---|---|---|
| BG Toggle Mode | R or R/W | OP[4] (1bit) | 0 | Disable (tCCD_L) |
| | | | 1 | Enable (tCCD_S) |

FIG. 9A

Read (DDR4)

| Function | Previous Cycle | Current Cycle | CS_n | ... | A17, A13, A11 | ... |
|---|---|---|---|---|---|---|
| | Previous Cycle | | | | | |
| Read (Fixed BL8 or BC4) | H | H | L | ... | V | ... |
| Read (BC4, on the Fly) | H | H | L | ... | V | ... |
| Read (BL8, on the Fly) | H | H | L | ... | V | ... |
| Read with Auto Precharge (Fixed BL8 or BC4) | H | H | L | ... | V | ... |
| Read with Auto Precharge (BC4, on the Fly) | H | H | L | ... | V | ... |
| Read with Auto Precharge (BL8, on the Fly) | H | H | L | ... | V | ... |

FIG. 9B

Read(DDR5)

| Function | CS_n | CA Pins | | | | | | | |
|---|---|---|---|---|---|---|---|---|---|
| | | CA0 | ... | CA9 | CA10 | CA11 | CA12 | ... |
| Read | L | H | ... | BG1 | BG2 | CID0 | CID1 | ... |
| | H | C2 | ... | V | H | V | V | ... |
| Read with Auto precharge | L | H | ... | BG1 | BG2 | CID0 | CID1 | ... |
| | H | C2 | ... | V or DRFM=L | AP=L | V | V | ... |

STORAGE MODULE SUPPORTING PREFETCH FUNCTION AND OPERATION METHOD THEREOF

CROSS-REFERENCE TO RELATED APPLICATION

This application claims priority under 35 U.S.C. § 119 to Korean Patent Application No. 10-2022-0087189, filed on Jul. 14, 2022, in the Korean Intellectual Property Office, the disclosure of which being incorporated by reference herein in its entirety.

BACKGROUND

Embodiments relate to a semiconductor memory device, and more particularly, relate to a storage module capable of supporting a prefetch function and an operation method thereof.

Semiconductor memory devices are largely classified into a volatile semiconductor memory device and a non-volatile semiconductor memory device. The volatile semiconductor memory device is fast in read and write speeds, but loses data stored therein when power is not supplied thereto. The volatile semiconductor memory device may be further divided into a dynamic random access memory (DRAM) and a static random access memory (SRAM).

A prefetch function or hardware prefetch function of a processor is a function that compensates for a time delay caused by the speed difference between a cache memory allocated to the processor and the DRAM in hardware. In other words, taking advantage of the fact that the speed of the cache memory of the processor is faster than that of the DRAM, the prefetch function brings in advance data expected to be used from the DRAM to the cache memory.

A size of data to be stored in the cache memory by the prefetch function generally has a fixed size regardless of the workload. In addition, to perform the prefetch operation, a host needs to transmit a plurality of read commands, and thus a read to read gap occurs. This is a factor that causes performance degradation due to unnecessary consumption of double data rate (DDR) clocks and increased wait time.

SUMMARY

It is an aspect to provide a storage module capable of dynamically determining the size of data to be prefetched and preventing the occurrence of a read to read gap such that optimal performance is exhibited according to a workload.

According to an aspect of one or more embodiments, there is provided a method comprising setting a characteristic value based on information on a prefetch size received from a host; and performing consecutive read operations on a storage module in units of cache lines based on one prefetch read command received from the host.

According to another aspect of one or more embodiments, there is provided a storage module comprising a memory device including a volatile memory; and a memory controller configured to control the memory device. The memory controller includes a control module configured to decode a setting command received from a host to identify information on a prefetch size, and to determine a number of read operations to be performed consecutively based on the prefetch size; and a register configured to store information on the number of read operations to be consecutively performed.

According to yet another aspect of one or more embodiments, there is provided a memory system comprising a host configured to determine a number of cache lines to be prefetched into a cache memory; and a storage module including a volatile memory, and configured to receive the number of cache lines from the host and determine a number of read operations to be consecutively performed based on the number of cache lines, wherein the storage module consecutively performs a read operation in units of the cache lines based on one prefetch read command received from the host.

BRIEF DESCRIPTION OF THE FIGURES

The above and other aspects will be more clearly understood from the following detailed description, taken in conjunction with the accompanying drawings, in which:

FIGS. 8A to 8C are diagrams illustrating an example of a mode register value set in a setting command, according to some embodiments;

FIGS. 9A and 9B are diagrams for describing an example of a transfer operation of a prefetch read command, according to some embodiments;

DETAILED DESCRIPTION

Hereinafter, various embodiments may be described in detail and clearly to such an extent that an ordinary one in the art may easily implement the various embodiments.

Figure 1:
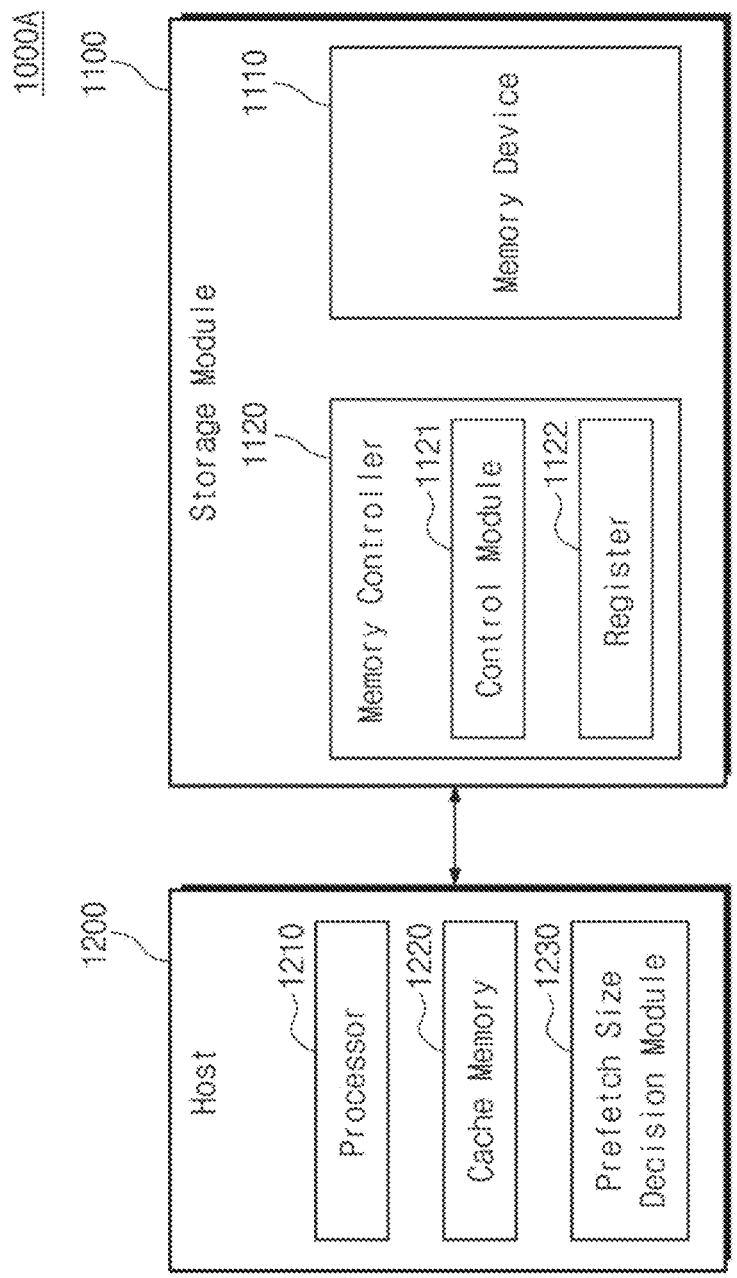
FIG. 1 is a block diagram illustrating an example of a memory system according to some embodiments

FIG. 1 is a block diagram illustrating an example of a memory system, according to some embodiments.

A memory system 1000A according to some embodiments may include a storage module 1100 and a host 1200, and may support a dynamic prefetch operation. The dynamic prefetch operation means that the host 1200 dynamically determines a prefetch size according to a workload, and a storage module 1100 performs a read operation based on the prefetch size determined by the host 1200. By supporting the dynamic prefetch operation, the memory system 1000A may store data of a size capable of exhibiting optimal performance according to a workload in the cache memory.

In some embodiments, the memory system 1000A may support a single prefetch read operation. The single prefetch read operation refers to consecutively performing read operations in units of cache lines based on one prefetch read command received from the host 1200. By supporting the single prefetch read operation, the memory system 1000A according to some embodiments may prevent the read to read gap from occurring. Accordingly, not only may a wait time be minimized, but also power consumption may be minimized.

Referring to FIG. 1, the memory system 1000A includes the storage module 1100 and the host 1200.

The storage module 1100 may communicate with the host 1200 and may write data or read data in response to a request of the host 1200.

The storage module 1100 may perform the single prefetch read operation according to a request from the host 1200. For example, the storage module 1100 may receive one prefetch read command (hereinafter, 'PRD') from the host 1200 and may consecutively perform read operations in units of cache lines based on the received command. To this end, the storage module 1100 may include the memory device 1110 and the memory controller 1120.

The memory device 1110 may include volatile memories. For example, the memory device 1110 may include a dynamic RAM (DRAM). In this case, the DRAM may be a clock synchronous DRAM such as a synchronous DRAM (SDRAM). For example, the DRAM may be a Synchronous DRAM (SDRAM), a Double Data Rate SDRAM (DDR SDRAM), or a Low Power Double Data Rate SDRAM (LPDDR SDRAM). Also, the memory device 1110 may include a volatile memory such as a RAMbus DRAM (RDRAM), a static RAM (SRAM), etc.

The memory controller 1120 may receive one prefetch read command PRD from the host 1200. The memory controller 1120 may control the storage module 1100 such that read operations in units of cache lines are consecutively performed based on one prefetch read command PRD. The memory controller 1120 may include a control module 1121 and a register 1122.

The control module 1121 may exchange commands and/or data with the host 1200. For example, the control module 1121 may exchange data with the host 1200 through various interface methods such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCI express (PCIe), an NVM express (NVMe), IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and/or a compact flash (CF) card interface.

The control module 1121 may receive information on a prefetch size from the host 1200. For example, the control module 1121 may receive a setting command, such as a mode register set (MRS) command or a mode register write (MRW) command, and may decode the setting command to recognize the prefetch size. The control module 1121 may determine the number of read operations to be consecutively performed based on the recognized prefetch size.

In some embodiments, the control module 1121 may receive toggle mode information from the host 1200. The toggle mode information may indicate whether to consecutively perform read operations on the same bank groups of a plurality of bank groups or to consecutively perform read operations on different bank groups of the plurality of bank groups. The control module 1121 may perform the read operations using a pulse width corresponding to a first access time tCCD_L or a pulse width corresponding to a second access time tCCD_S, based on the toggle mode information. The first access time tCCD_L may be an access time corresponding to the same bank groups, and the second access time tCCD_S may be an access time corresponding to the different bank groups. In other words, the first access time tCCD_L refers to an access time for accessing the same bank group after accessing a selected bank group, and the second access time tCCD_S refers to an access time for accessing different bank group after accessing a selected bank group.

The register 1122 may store information related to the single prefetch read operation. For example, the register 1122 may store information on the number of read operations to be consecutively performed. In some embodiments, the register 1122 may store toggle mode information.

Continuing to refer to FIG. 1, the host 1200 may perform a prefetch operation of fetching data that is expected to be used from the storage module 1100 in advance and storing the data in the host 1200. In particular, in some embodiments, the host 1200 may perform the dynamic prefetch operation that determines an optimal prefetch size according to a workload. To this end, the host 1200 may include a processor 1210, a cache memory 1220, and a prefetch size decision module 1230.

The processor 1210 may perform various arithmetic operations and/or processing operations. For example, the processor 1210 may perform arithmetic operations and/or processing operations using data stored in the cache memory 1220. When there is no data required in the cache memory 1220, the processor 1210 may perform arithmetic operations and/or processing operations using data stored in the storage module 1100.

The cache memory 1220 may store data used by the processor 1210. The cache memory 1220 may include, for example, a memory having a faster input/output speed than a memory constituting the storage module 1100. For example, the cache memory 1220 may include an SRAM and the storage module 1100 may include a DRAM. Since data used by the processor 1210 are stored in the cache memory 1220 in advance, the processing speed of the processor 1210 may be increased.

The cache memory 1220 may store data in units of cache lines (hereinafter, 'CL'). In some embodiments, the cache line CL may have, for example, a size of 64 bytes, which is an input/output unit of the memory device 1110 formed of a DRAM. For example, when the size of the cache line CL is 64 bytes and the number of the cache lines CL is 7, the cache memory 1220 may store a total of 448 bytes of data. However, this is only an example, and, in some embodiments, the size of the cache line CL may be variously set, such as 32 bytes or 128 bytes.

The prefetch size decision module 1230 may determine the overall size of data to be stored in the cache memory 1220 by the prefetch operation. For example, when data are stored in the cache memory 1220 in units of cache lines CL, the prefetch size decision module 1230 may determine the number of cache lines CL to determine the size of the overall data to be stored in the cache memory 1220.

In some embodiments, the prefetch size decision module 1230 may set the number of cache lines CL differently according to a workload to be performed by the processor 1210. That is, the prefetch size decision module 1230 may determine the number of cache lines CL differently according to a workload such that the processor 1210 may exhibit optimal performance. For example, the prefetch size decision module 1230 may determine the number of cache lines CL based on a cache hit ratio according to a workload. Through such a dynamic prefetch operation, the processor 1210 may exhibit optimal performance for each workload.

As described above, the memory system 1000A according to some embodiments may exhibit optimal performance according to a workload by supporting a dynamic prefetch operation, and may prevent a read to read gap from occurring by supporting a single prefetch read operation, thereby minimizing the wait time and power consumption.

Figure 2:
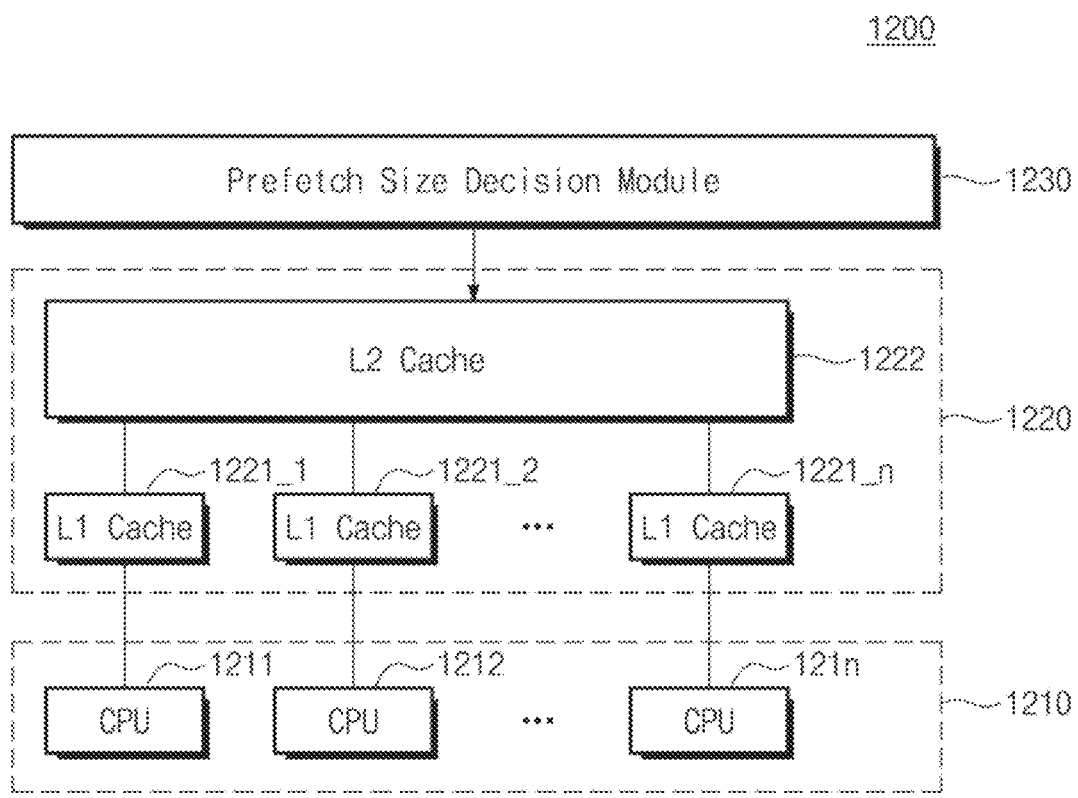
FIG. 2 is a block diagram illustrating an example of a host of the memory system of FIG. 1, according to some embodiments.

FIG. 2 is a block diagram illustrating an example of the host 1200 of FIG. 1, according to some embodiments. Referring to FIG. 2, the host 1200 may include the processor 1210, the cache memory 1220, and the prefetch size decision module 1230.

The processor 1210 may be implemented as a multi-processor system. That is, the processor 1210 may be implemented to include a plurality of central processing unit (CPU) cores 1211 to 121n. However, this is only an example, and in some embodiments, the processor 1210 may be implemented as a uni-processor system including only one CPU.

The cache memory 1220 may be implemented to have a cache hierarchy. Each level of the cache hierarchy may be referred to as a cache level. For example, the cache memory 1220 may include L1 caches 1221_1 to 1221_n and an L2 cache 1222.

The L1 caches 1221_1 to 1221_n are disposed close to the processor 1210, and may be smaller and faster caches than the L2 cache 1222. One L1 cache may be a private cache allocated to only one CPU core. Accordingly, the stored data of one L1 cache may be accessed only by the corresponding CPU core. That is, in a configuration with a plurality of CPU cores 1211 to 121n, a respective one of the L1 caches 1221_1 to 1221_n may be allocated to each of the plurality of CPU cores 1211 to 121n, and thus the L1 cache 1221_1 may be allocated as a private cache of CPU core 1211, and the L1 cache 1221_2 may be allocated as a private cache of CPU core 1212, etc.

The L2 cache 1222 is disposed further away from the processor 1210, and may be a larger and slower cache than the L1 caches 1221_1 to 1221_n. The L2 cache 1222 may be a shared cache shared by the plurality of CPU cores 1211 to 121n.

Although FIG. 2 illustrates a two-level cache hierarchy of the L1 caches 1221_1 to 1221_n and the L2 cache 1222, embodiments are not limited thereto. For example, the cache memory 1220 may further include an L3 cache and/or an L4 cache.

In general, when the processor 1210 requests data that exist in the cache memory 1220, the request is called a cache hit, and when the processor 1210 requests data that do not exist in the cache memory 1220, the request is called a cache miss. Since an access request on a cache hit may be processed much faster than an access request on a cache miss, it is advantageous to have a solution for increasing the cache hit ratio.

To increase the cache hit ratio, the prefetch size decision module 1230 according to some embodiments may set the size of data to be stored in advance in the cache memory 1220 differently according to the workload. For example, when the size of the cache line CL is fixed to 32, 64, or 128 bytes, the prefetch size decision module 1230 may set the number of cache lines CL differently according to the workload to set the size of data to be stored in the cache memory 1220 differently. For example, the prefetch size decision module 1230 may set the number of cache lines CL according to the workload in consideration of temporal locality, spatial locality, or sequential locality of data. As described above, by setting the size of the data to be prefetched differently according to the workload, the performance of the memory system may be optimized.

Figure 3:
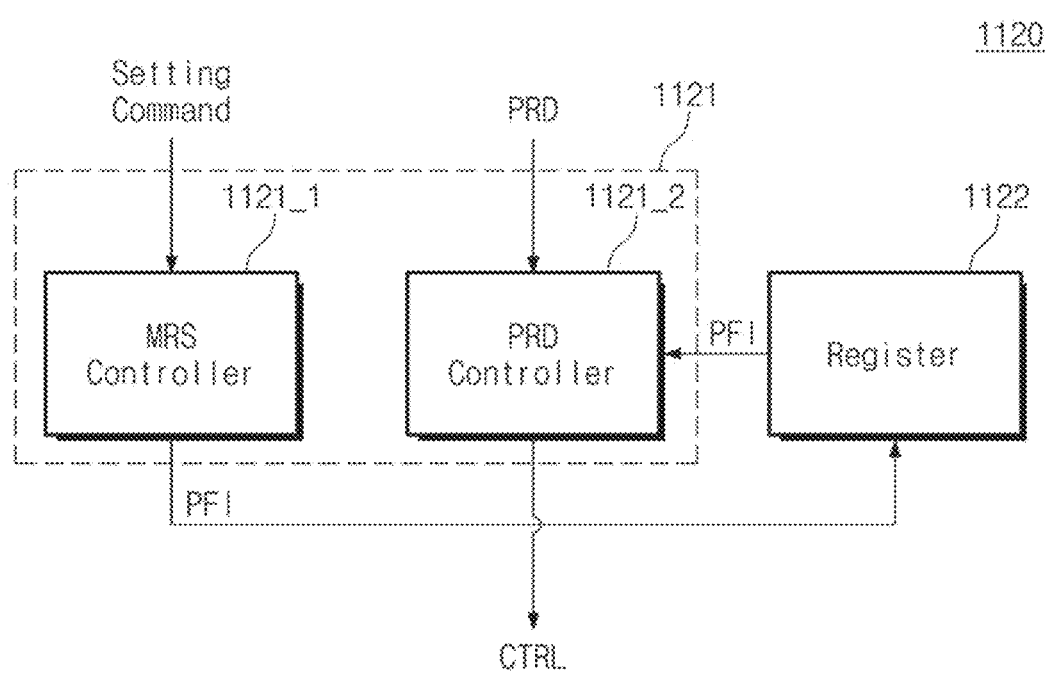
FIG. 3 is a block diagram illustrating an example of a memory controller of the memory system of FIG. 1, according to some embodiments.

FIG. 3 is a block diagram illustrating an example of the memory controller 1120 of FIG. 1, according to some embodiments. Referring to FIG. 3, the memory controller 1120 may include the control module 1121 and the register 1122, and the control module 1121 may include an MRS controller 1121_1 and a PRD controller 11212.

The MRS controller 1121_1 may receive a setting command related to a prefetch operation from the host 1200, and may set the number of consecutive read operations (NCR) by decoding the setting command. In this case, one read operation may read data in units of cache lines CL. For example, when the size of the cache line CL is 64 bytes and a burst length 'BL' is 16, one read operation may be performed for 4 cycles. Such a read operation may be referred to as, for example, a burst read operation. In this case, when the number of cache lines CL requested from the host 1200 is 7, the MRS controller 1121_1 may set the number of consecutive read operations NCR to be 7. The MRS controller 1121_1 may store information on the number of consecutive read operations NCR in the register 1122.

The MRS controller 1121_1 may decode the setting command to identify information on a toggle mode TM. For example, when the toggle mode is enabled, the MRS controller 1121_1 is set to consecutively perform read operations associated with different bank groups, and may perform the consecutive read operations based on the second access time tCCD_S. As another example, when the toggle mode is disabled, the MRS controller 1121_1 is set to consecutively perform read operations associated with the same bank groups, and may perform the consecutive read operations based on the first access time tCCD_L. The MRS controller 1121_1 may store information on the toggle mode TM and/or the access time tCCD in the register 1122.

The setting command may have any form as long as the setting command is a signal for setting a mode register related to a refresh operation. For example, the setting command may be a Mode Register Set (MRS) command in a DDR4 or a Mode Register Write (MRW) command in a DDR5.

Continuing to refer to FIG. 3, the PRD controller 1121_2 may receive the prefetch read command PRD from the host 1200. The PRD controller 1121_2 may receive prefetch information PFI from the register 1122. In this case, the prefetch information PFI may include information on the number of consecutive read operations NCR, the toggle mode TM, and/or the access time tCCD. The PRD controller 1121_2 may output a control signal CTRL for controlling the read operation with respect to the memory device 1110 based on the prefetch information PFI.

The PRD controller 1121_2 may count the number of read operations. When the number of consecutive read operations NCR reaches a threshold number, the PRD controller 1121_2 may end the read operation. In some embodiments, the threshold number may be preset.

Figure 4:
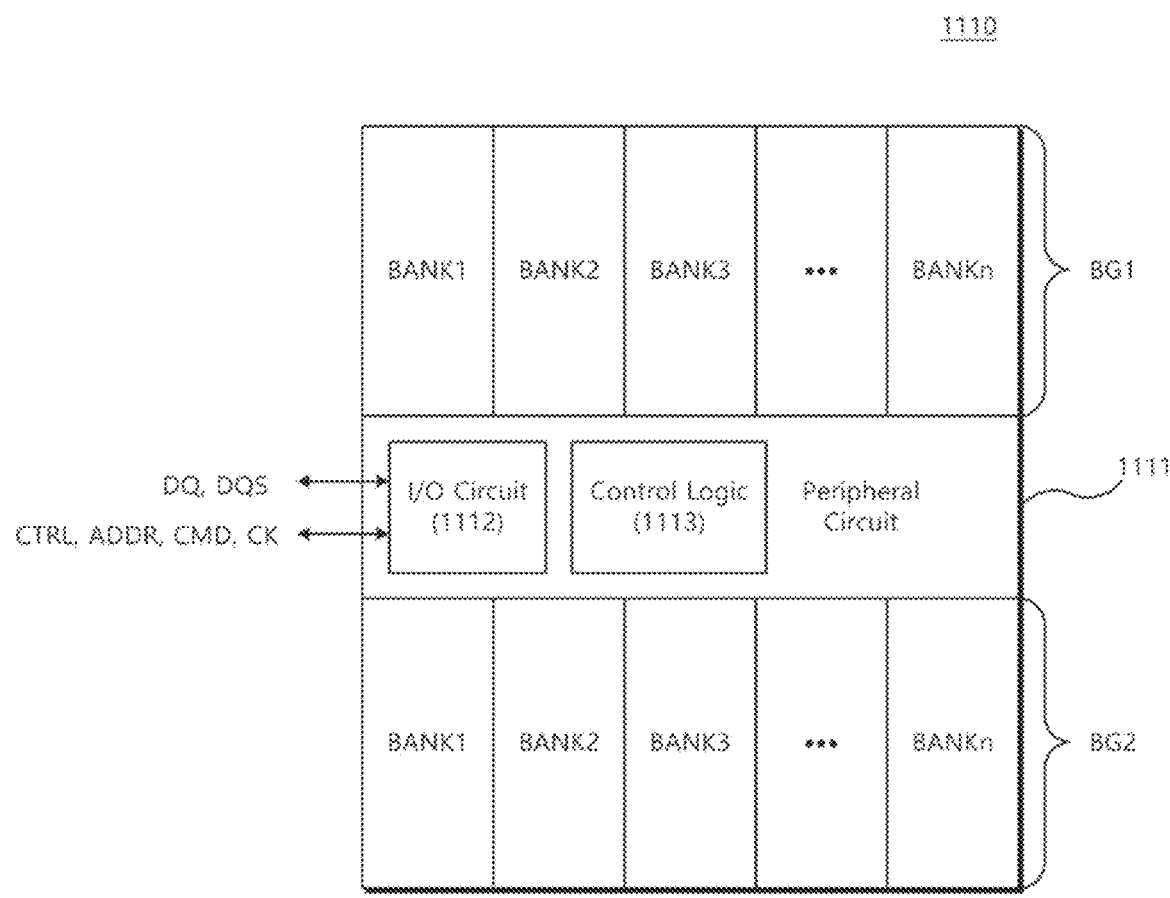
FIG. 4 is a block diagram illustrating an example of a memory device of the memory system of FIG. 1, according to some embodiments.

FIG. 4 is a block diagram illustrating an example of the memory device 1110 of FIG. 1, according to some embodiments.

Referring to FIG. 4, the memory device 1110 may include a first bank group BG1 and a second bank group BG2. Each of the first bank group BG1 and the second bank group BG2 may include first to n-th banks BANK1 to BANKn. Each of the first to n-th banks BANK1 to BANKn of the first bank group BG1 and the second bank group BG2 may have a same structure and may operate in the same manner.

Each of the first to n-th banks BANK1 to BANKn may include memory cells. The memory cells may be used to store data transferred from the host 1200. For example, the memory cells may be volatile memory cells such as a DRAM, an SDRAM, a DDR SDRAM, an LPDDR SDRAM, an RDRAM, an SRAM, etc.

The memory device 1110 may further include a peripheral circuit 1111. The peripheral circuit 1111 may receive a command CMD, an address ADDR, and a clock signal CK from the host 1200. The peripheral circuit 1111 may select a bank indicated by the address ADDR from among the first to n-th banks BANK1 to BANKn of the first bank group BG1 and the second bank group BG2. The peripheral circuit 1111 may control the selected bank to perform an operation indicated by the command CMD, for example, a write operation or a read operation, with respect to the memory cells indicated by the address ADDR among the memory cells of the selected bank.

The peripheral circuit 1111 may include an input/output circuit 1112 configured to exchange data signals DQ and data strobe signals DQS with the host 1200. The data strobe signals DQS may provide timing to latch the data signals DQ.

The peripheral circuit 1111 may further include control logic 1113 configured to control the selected bank in response to the command CMD, the address ADDR, and/or the clock signal CK.

In some embodiments, the peripheral circuit 1111 may receive the control signal CTRL from the PRD controller 1121_2. The peripheral circuit 1111 may control the memory device 1110 to perform a single prefetch read operation, in response to the control signal CTRL.

In more detail, when the prefetch read command PRD is received from the host 1200, the PRD controller 1121_2 (refer to FIG. 3) may generate the control signal CTRL for controlling a read operation with respect to the memory device 1110 based on the prefetch information PFI stored in the register 1122 (refer to FIG. 3), and may transfer the generated control signal CTRL to the peripheral circuit 1111.

When the toggle mode is enabled, the peripheral circuit 1111 may control the memory device 1110 to alternately perform read operations with respect to the first bank group BG1 and the second bank group BG2 at intervals of the second access time tCCD_S, in response to the control signal CTRL. In this case, the read operation may be performed in units of cache lines CL. The read data may be temporarily stored in the input/output circuit 1112, and may be synchronized with the clock signal CK to be transferred to the host 1200.

When the toggle mode is disabled, the peripheral circuit 1111 may control the memory device 1110 to consecutively perform read operations on a same bank group at intervals of the first access time tCCD_L, in response to the control signal CTRL. In other words, the memory device 1110 may consecutively perform read operations on the first to n-th banks BANK1 to BANKn of the first bank group BG1 or on the first to n-th banks BANK1 to BANKn of the second bank group BG2. In this case, the read operation may be performed in units of cache lines CL. The read data may be temporarily stored in the input/output circuit 1112, and may be synchronized with the clock signal CK to be transferred to the host 1200.

In the single prefetch read operation, the prefetch read command PRD may be input from the host 1200 only once. That is, the prefetch read command PRD is input only once when the single prefetch read operation starts, and thereafter, an additional prefetch read command PRD or a read command may not be input until the single prefetch read operation is completed. Accordingly, occurrence of a read to read gap due to a plurality of commands is prevented, such that not only a wait time may be minimized, but also power consumption may be minimized.

As illustrated in FIGS. 1 to 4, the memory system 1000A according to some embodiments may set the number of cache lines CL differently according to a workload. Accordingly, the performance of the memory system 1000A may be improved. In some embodiments, the memory system 1000A may consecutively perform a read operation based on one prefetch read command. Accordingly, occurrence of the read to read gap may be prevented, and thus a wait time and power consumption may be minimized.

Figure 5:
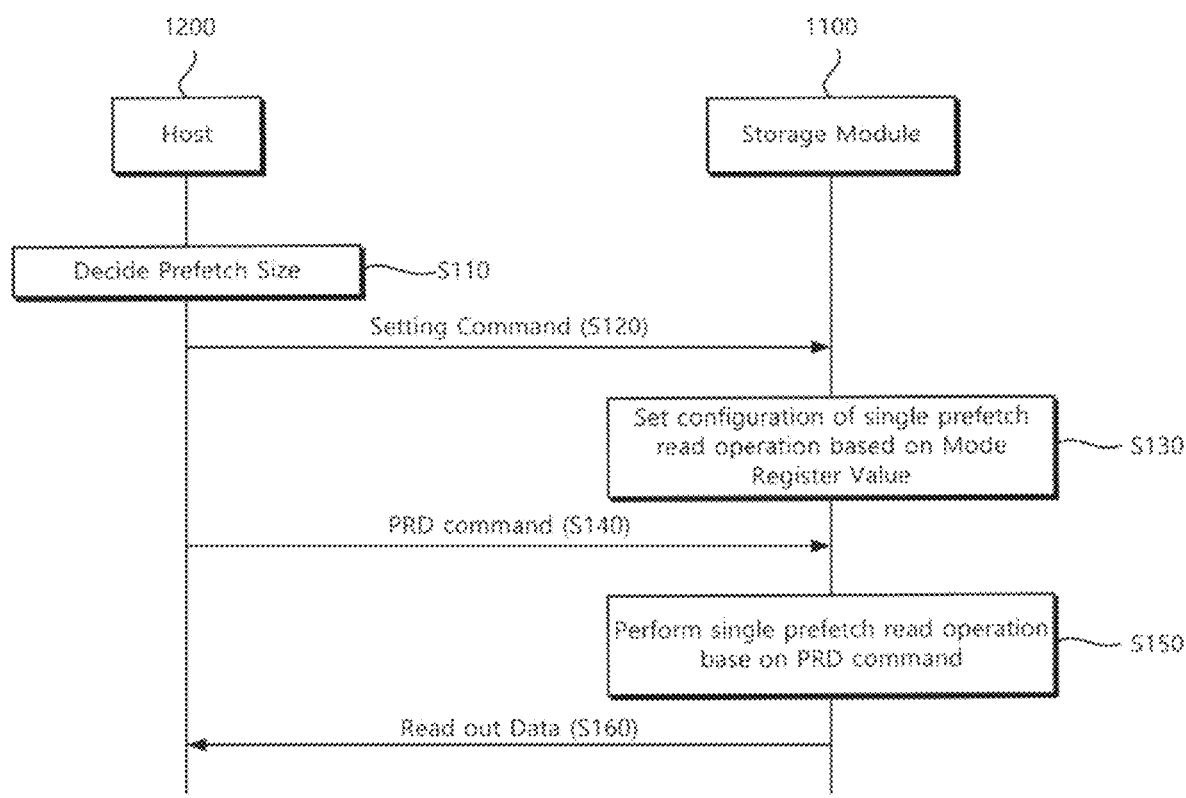
FIG. 5 is a flowchart illustrating an example of an operation of the memory system of FIG. 1, according to some embodiments.

FIG. 5 is a flowchart illustrating an example of an operation of the memory system 1000A of FIG. 1, according to some embodiments.

In operation S110, the host 1200 may determine a prefetch size according to a workload. For example, when the unit of the cache lines CL is fixed, the host 1200 may determine the number of cache lines CL to be stored in advance in the cache memory 1220 (refer to FIG. 1) according to the workload.

The host 1200 may determine a mode register value based on the determined number of cache lines CL, and in operation S120 the host may transfer a setting command including the determined mode register value to the storage module 1100 through a command (CMD) bus. For example, the setting command may be the MRS command of the DDR4 or the MRW command of the DDR5.

In operation S130, the storage module 1100 may set a configuration of a single prefetch read operation based on the mode register value. For example, the storage module 1100 may decode the mode register value and may set a characteristic value for the single prefetch read operation based on the decoded mode register value. For example, the storage module 1100 may set information on the number of read operations to be consecutively performed, the toggle mode TM, and/or the access time tCCD, and may store the information in the register 1122 (refer to FIG. 3).

In operation S140, the host 1200 may transfer the prefetch read command PRD to the storage module 1100 through the CMD bus. For example, the prefetch read command PRD may be implemented using only one bit. In some embodiments, the prefetch read command PRD may be transferred to the storage module 1100 only once regardless of the number of cache lines CL determined by the host 1200 and/or the number of read operations to be performed in the storage module 1100.

In operation S150, the storage module 1100 may perform the single prefetch read operation based on the prefetch read command PRD. For example, when the determined number of cache lines CL is 'n', 'n' consecutive read operations may be performed based on one prefetch read command PRD.

In operation S160, the storage module 1100 may transfer the read data to the host 1200 through a data bus. For example, the storage module 1100 may temporarily store the read data in the input/output circuit 1112 (FIG. 4), and then sequentially transfer the read data to the host 1200 in synchronization with the DDR clock.

Figure 6:
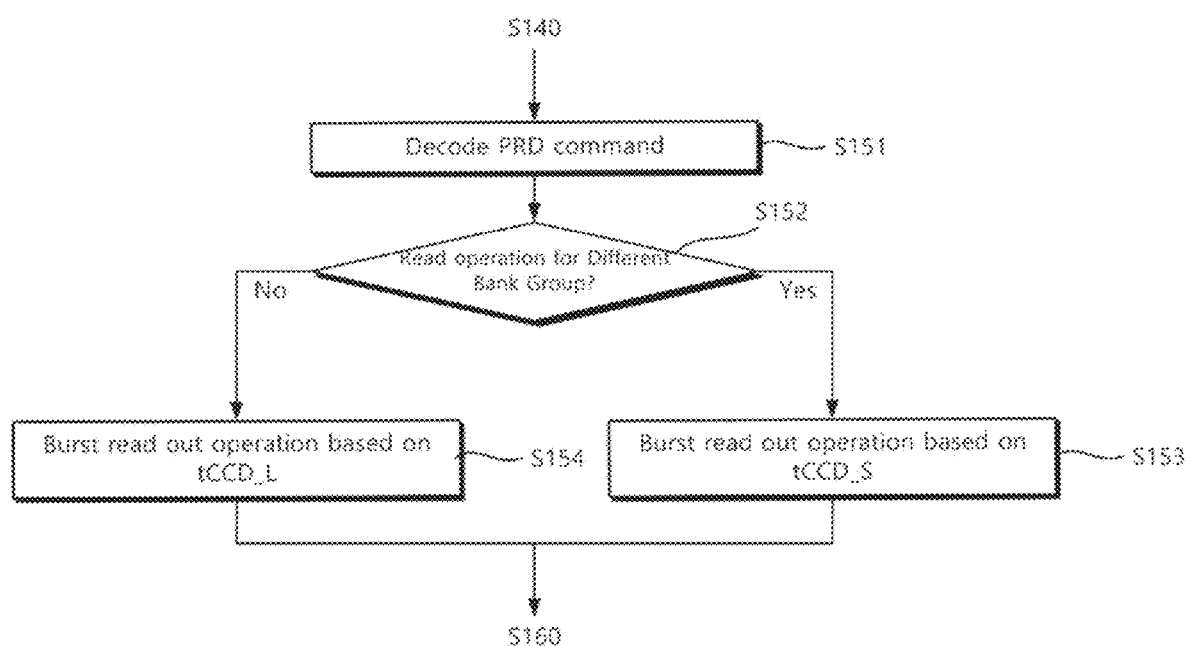
FIG. 6 is a flowchart illustrating a single prefetch read operation in the flowchart of FIG. 5 in more detail, according to some embodiments.

FIG. 6 is a flowchart illustrating a single prefetch read operation in operation S150 of FIG. 5 in more detail, according to some embodiments.

In operation S151, the storage module 1100 may decode the prefetch read command PRD.

In operation S152, the storage module 1100 determine whether a read operation is performed with respect to different bank groups. For example, the storage controller 1100 may identify the toggle mode TM and identify whether a read operation is performed with respect to different bank groups.

When the toggle mode TM is enabled, the storage module 1100 performs a read operation between the different bank groups. In detail, in operation S153, the storage module 1100 may alternately perform a read operation with respect to the different bank groups based on a pulse width corresponding to the second access time tCCD_S. In this case, the read order for each bank group may be performed in a column stride scheme. For example, when the number of cache lines CL determined by the host 1200 is 'n', 'n' read operations are performed in units of cache lines CL, and accordingly, data corresponding to a total size of n* cache lines CL may be read from different bank groups.

When the toggle mode TM is disabled, the storage module 1100 performs a read operation on a same bank group. In detail, in operation S154, the storage module 1100 may consecutively perform read operations with respect to banks of a same bank group based on a pulse width corresponding to the first access time tCCD_L longer than the second access time tCCD_S. In this case, the read order for each bank group may be performed in a column stride scheme.

As described in FIGS. 5 and 6, the memory system 1000A according to some embodiments may read data corresponding to 'n' cache lines CL based on one prefetch read command PRD, and may store the read data in the cache memory. In general, to store data corresponding to 'n' cache lines CL in the cache memory, the host needs to transfer 'n' read commands to the storage module through a command (CMD) bus. In contrast, the memory system 1000A according to some embodiments may read data corresponding to the 'n' cache lines CL using one prefetch read command PRD and may store the read data in the cache memory. Accordingly, since it is not necessary to use a plurality of read commands, the use efficiency of the CMD bus may be increased. The power required may be reduced by reducing the number of commands. The occurrence of a read to read gap is prevented, such that a wait time may be decreased.

Figure 7:
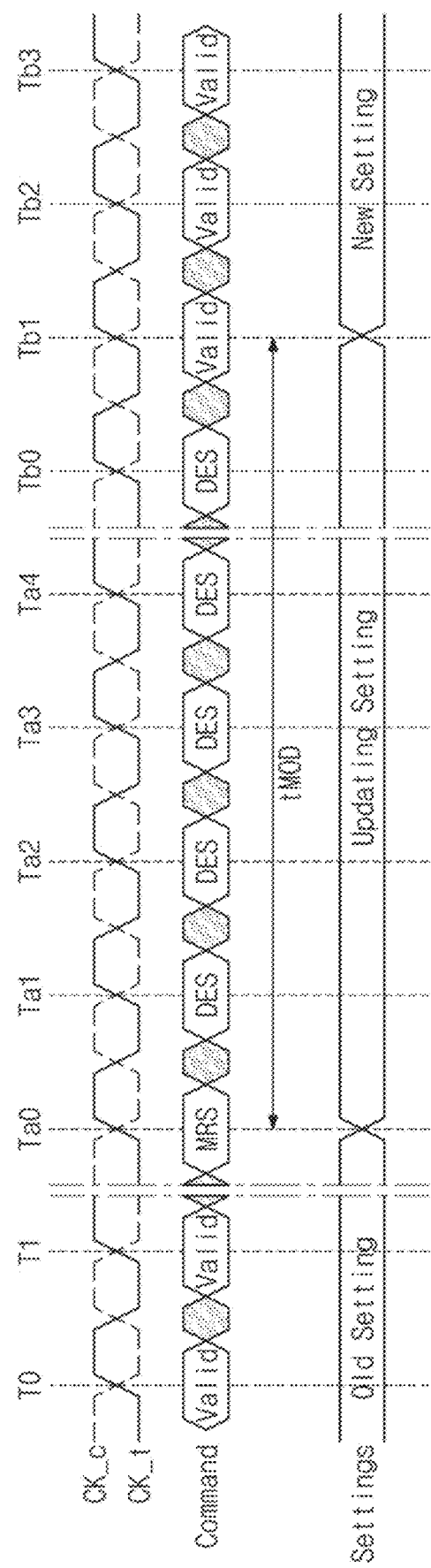
FIG. 7 is a timing diagram illustrating an example of an operation of transferring and setting a setting command, according to some embodiments.

FIGS. 7 and 8 are diagrams for describing a setting command transfer and setting operation in operations S120 and S130 of FIG. 6, according to some embodiments. In detail, FIG. 7 is a timing diagram illustrating an example of an operation of transferring and setting a setting command, and FIG. 8 is a diagram illustrating an example of a mode register value set in a setting command.

Referring to FIG. 7, times T0 to Ta0 may be in an old setting state.

At the time Ta0, the host 1200 may provide the setting command MRS to the storage module 1100. For example, in the DDR4, when all banks are in an idle state, the host 1200 may provide the setting command MRS to the storage module 1100.

At times Ta0 to Tb1, the host 1200 does not provide a non-setting command. In this case, the non-setting command may refer to a command other than the setting command MRS. For example, the non-setting command may be an active/read/write command. Such times Ta0 to Tb1 may be referred to as an update delay time tMOD. During the update delay time tMOD, the storage module 1100 may decode the setting command MRS, may identify information on the single prefetch read operation, and may set the single prefetch read operation.

Thereafter, after the time Tb1, the storage module 1100 may receive the non-setting command.

In some embodiments, although not illustrated separately, the mode register setting process of the DDR5 may be performed as in the above description. For example, when all banks are in an idle state during a normal operation, the host 1200 may provide the setting command MRW to the storage module 1100. The host 1200 does not provide the non-setting command to the storage module 1100 during the update delay time tMOD. During the update delay time tMOD, the storage module 1100 sets the single prefetch read operation. After the update delay time tMOD elapses, the storage module 1100 may receive the non-setting command.

In FIG. 8A, when the setting command is an MRS command of the DDR4, logical values of respective signals (CKE, CS_n, RAS_n, CAS_n, WE_n, BG0 to BG1, BA0 to BA1, C2 to C0, A12, A17, A14, A11, A10, A0 to A9, etc.) of the MRS command are illustrated. Here, 'H' denotes logic high, 'L' denotes logic low, '13G' denotes a bank group address, 'BA' denotes a bank address, 'X' denotes either 'H' or 'L', or denotes that the value is not defined (i.e., don't care), such as floating state, and 'V' denotes a logic level defined as 'H' or 'L'. An OP code denotes an operating code.

In FIG. 8B, when the setting command is the MRW command of the DDR5, the logical values of the respective signals (CS_n and CA0 to CA13) of the MRW command are illustrated. Here, 'H' denotes logic high, 'L' denotes logic low, MRA0 to MRA7 denotes a mode register address, and 'V' denotes a logic level defined as 'H' or 'L'. OP0 to OP7 denotes operating codes.

Referring to FIGS. 8A and 8B, by using the operating code (OP code) of the MRS command of the DDR4 or the operating code (OP0 to OP7) of the MRW command of the DDR5, information related to the single prefetch read operation may be represented. For example, information related to the single prefetch read operation in the setting command may be as illustrated in FIG. 8C.

Referring to FIG. 8C, the operating code may be, for example, 5 bits OP[4:0].

For example, OP[3:0] may indicate the number of cache lines CL determined by the host 1200. The number of cache lines CL to be stored in the cache memory 1220 (refer to FIG. 1) may vary depending on data 0000 to 1111 written in OP[3:0]. When the read operation of the storage module 1100 is performed in units of the cache lines CL, the data 0000 to 1111 written in OP[3:0] may correspond to the number of read operations NCR to be consecutively performed in the storage module 1100.

As an example, OP[4] may indicate the toggle mode TM. For example, when the data of OP[4] is '1', the toggle mode TM may be in an active state. In this case, the storage module 1100 may alternately perform read operations on different bank groups at intervals of the second access time tCCD_S. As another example, when the data of OP[4] is '0', the toggle mode TM may be in an inactive state. In this case, the storage module 1100 may consecutively perform read operations with respect to banks of a same bank group at intervals of the first access time tCCD_L.

FIGS. 9A-9B are diagrams for describing an example of a transfer operation of the prefetch read command PRD in operation S140, according to some embodiments.

In FIG. 9A, when the command is a Read command of the DDR4, logical values of respective signals (CAS_n, A17, A13, A11, etc.) of the Read command are illustrated. Here, 'H' denotes logic high, 'L' denotes logic low, 'X' denotes 'H' or 'L', or denotes the value is not defined (i.e., don't care), such as a floating state.

As illustrated in FIG. 9A, the signals A17, A13, and A11 may not be defined in the DDR4. In some embodiments, the prefetch read command PRD may be transferred using any one of undefined A17, A13, and A11 signals. For example, the prefetch read command PRD may be transferred using the A17 signal having 1-bit. Since the prefetch read command PRD uses only one bit, the overhead of the CMD bus may be minimized.

In FIG. 9B, when the command is a Read command of the DDR5, logical values of respective signals (CS_n, CA0 to CA12, etc.) of the Read command are illustrated.

As illustrated in FIG. 9B, the signals CA9, CA11, and CA12 may not be defined in the DDR5. In some embodiments, the prefetch read command PRD may be represented using any one of undefined CA9, CA11, and CA12 signals. Since the prefetch read command PRD uses only one bit, even when the memory system 1000A supports the DDR5, the overhead of the CMD bus can also be minimized.

Figure 10:
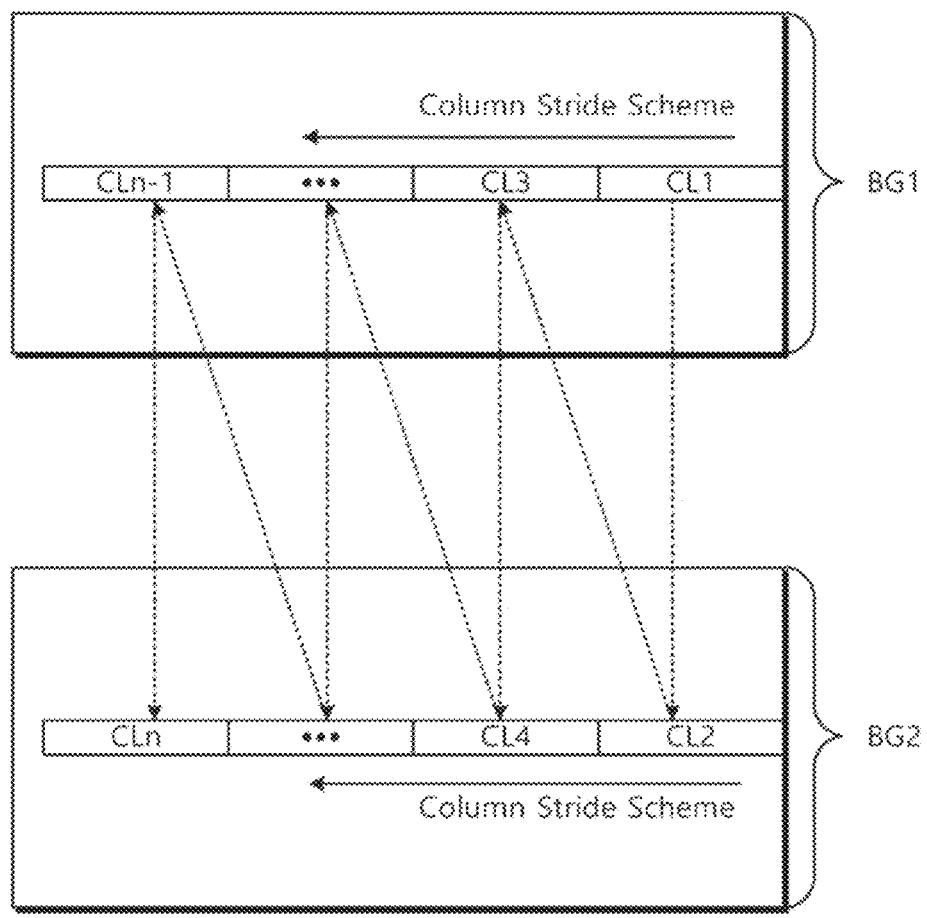
FIGS. 10, 11A, and 11B are comparison diagrams for describing an example of a single prefetch read operation, according to some embodiments.
Figure 11A:
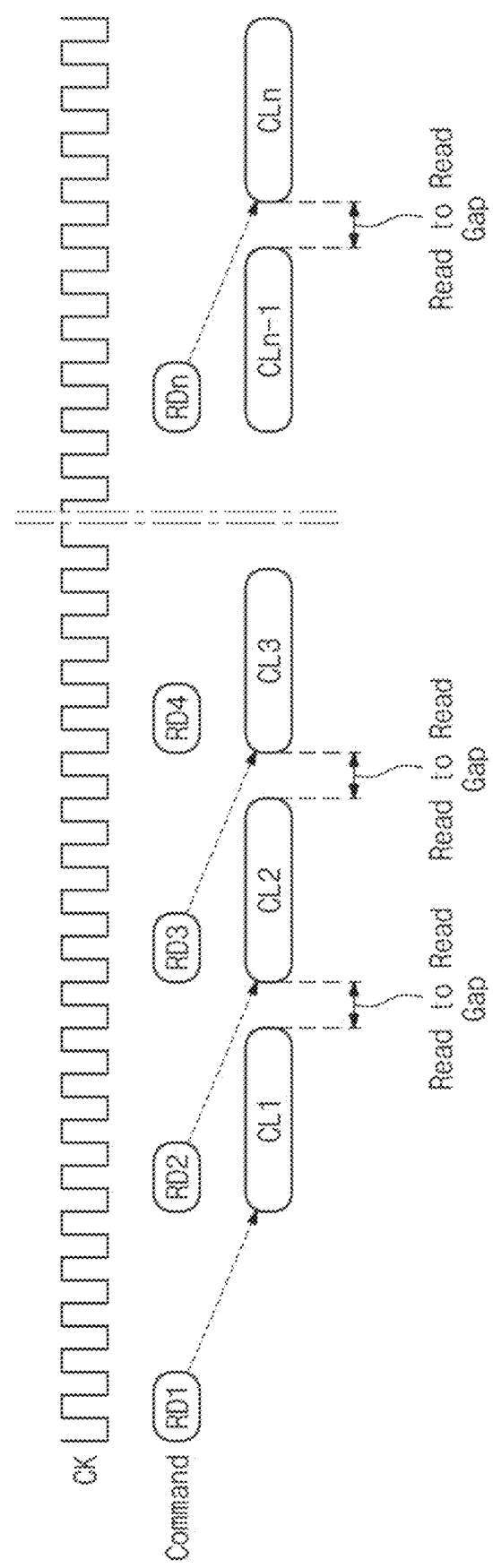
Figure 11B:
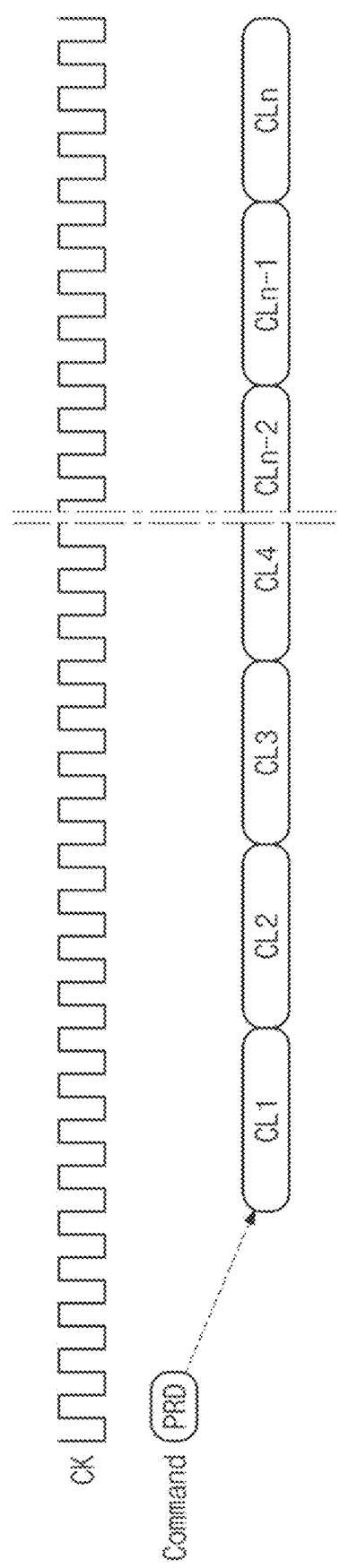

FIGS. 10 and 11A-11B are comparison diagrams for describing an example of a single prefetch read operation in operation S150. In detail, FIG. 10 illustrates a single prefetch read operation with respect to different bank groups, according to some embodiments. In FIG. 11A, a timing diagram for a related art prefetch read operation is illustrated, and in FIG. 11B, a timing diagram for a single prefetch read operation according to some embodiments is illustrated by way of example.

Referring to FIG. 10, the single prefetch read operation may be performed in response to the prefetch read command PRD. When the toggle mode TM is enabled, read operations with respect to different bank groups are alternately performed, such that the single prefetch read operation may be performed. For example, it is assumed that 'n' consecutive read operations are performed. In this case, a read operation corresponding to the data size of the first cache line CL1 may be performed on the first bank group BG1, and thereafter, a read operation corresponding to the data size of the second cache line CL2 may be performed on the second bank group BG2. In this way, read operations corresponding to the data sizes of the first to n-th cache lines CL1 to CLn may be alternately performed between the first bank BG1 and the second bank BG2.

A read operation for each bank group may be performed in a column stride scheme. For example, when a read operation is performed on the first bank group BG1 or the second bank group BG2, the read operation may be sequentially performed in one direction from left to right.

A related art prefetch read operation is performed based on a plurality of read commands RD. For example, as illustrated in FIG. 11A, the storage module receives 'n' read commands from the host and performs 'n' read operations based on the 'n' read commands. In this case, a gap or a timing bubble may exist between data read by adjacent read commands. For example, a read to read gap occurs between data corresponding to the first cache line CL1 read by the first read command RD1 and data corresponding to the second cache line CL2 read by the second read command RD2. Such a read to read gap not only consumes the DDR clock of the storage module unnecessarily, but also causes performance degradation in the host due to an increase in the wait time.

As illustrated in FIG. 11B, the single prefetch read operation according to some embodiments may be performed based on one prefetch read command PRD. Accordingly, the occurrence of a read to read gap due to a plurality of read commands is prevented, and consequently, unnecessary consumption of the DDR clock and increase in the wait time may also be prevented. In some embodiments, since only one command PRD is transferred through the CMD Bus, loss of the command bus on the interface may also be prevented. In some embodiments, since only one command PRD is generated without the need to generate a plurality of read commands, overall power consumption may also be reduced.

The single prefetch read operation according to some embodiments may be implemented in various ways. Hereinafter, various modifications of a single prefetch read operation according to some embodiments will be described in more detail.

Figure 12A:
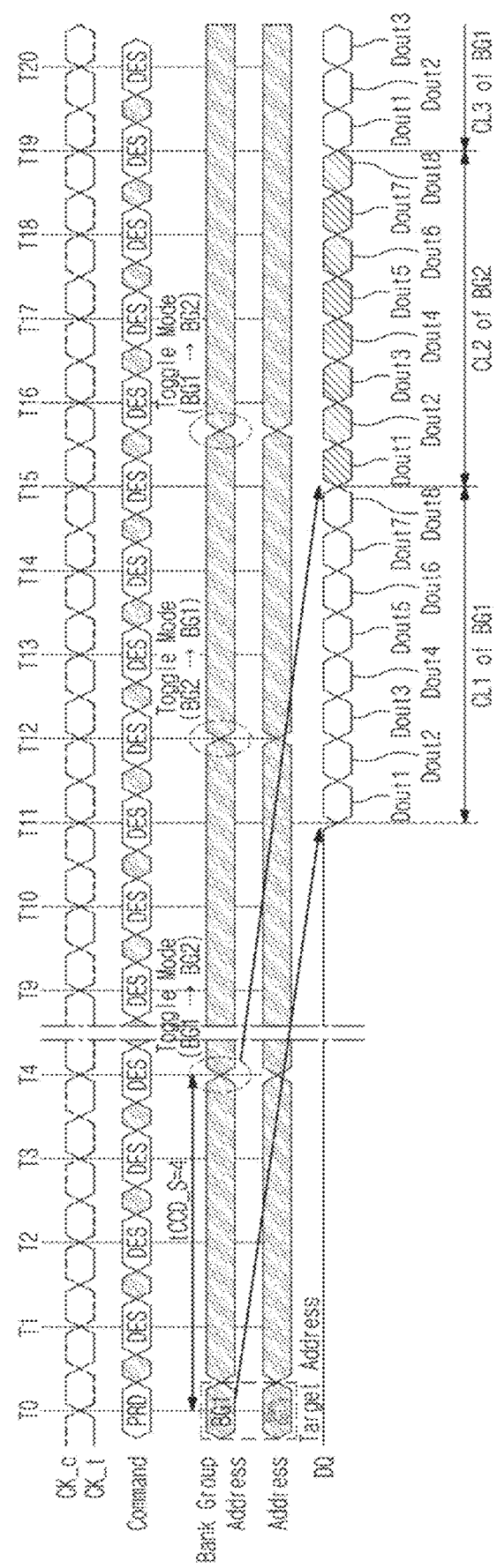
FIGS. 12A to 12F are diagrams illustrating various examples of a single prefetch read operation, according to some embodiments.

FIG. 12A is a diagram illustrating an example of a single prefetch read operation supporting consecutive read operations for different bank groups according to some embodiments. For example, in FIG. 12A, the DDR4 may be supported, the burst length BL may be 8, the second access time tCCD_S may be 4, and the read latency (hereinafter, 'RL') may be 11. Although not illustrated, 1tCK or 2tCK may be applied to the preamble.

Referring to FIG. 12A, at time T0, the prefetch read command PRD may be provided to the storage module 1100 (refer to FIG. 1) through the CMD bus from the host 1200 (refer to FIG. 1). In this case, a target address may be provided together. The target address may include an address for the target bank group and an address for the target bank. For example, the target bank group may be the first bank group BG1, and the target bank address may be a first bank column 'Bank Col1'.

Since the read latency RL is 11, data with respect to the first bank group BG1 may be read at a time T11 when 11 clocks elapse from the time T0. In this case, the size of the read data may correspond to the burst length BL of 8 and may correspond to a size of the cache line CL of the cache memory 1220 (refer to FIG. 1).

Since the second access time tCCD_S is set to 4, a bank group in which a read operation is performed may be changed based on 4 clocks. For example, a bank group to which a read operation is performed may be changed from the first bank group BG1 to the second bank group BG2 at a time T4 when 4 clocks elapses from the time T0.

Since the read latency RL is 11, data with respect to the second bank group BG2 may be read at a time T15 when 11 clocks elapses from the time T4. In this case, the size of the read data may correspond to the burst length BL of 8 and may correspond to a size of the cache line CL of the cache memory 1220 (refer to FIG. 1). In this way, data may be alternately read from the first bank group BG1 and the second bank group BG2 in units of the cache lines CL.

In each of the first bank group BG1 and the second bank group BG2, data may be read in a column stride scheme. That is, in each bank group, column addresses may be sequentially selected in one direction from left to right (or from right to left). Accordingly, an additional address other than the target address is not required, and consequently, loss of a command bus on the interface and occurrence of a read to read gap may be prevented.

Figure 12B:
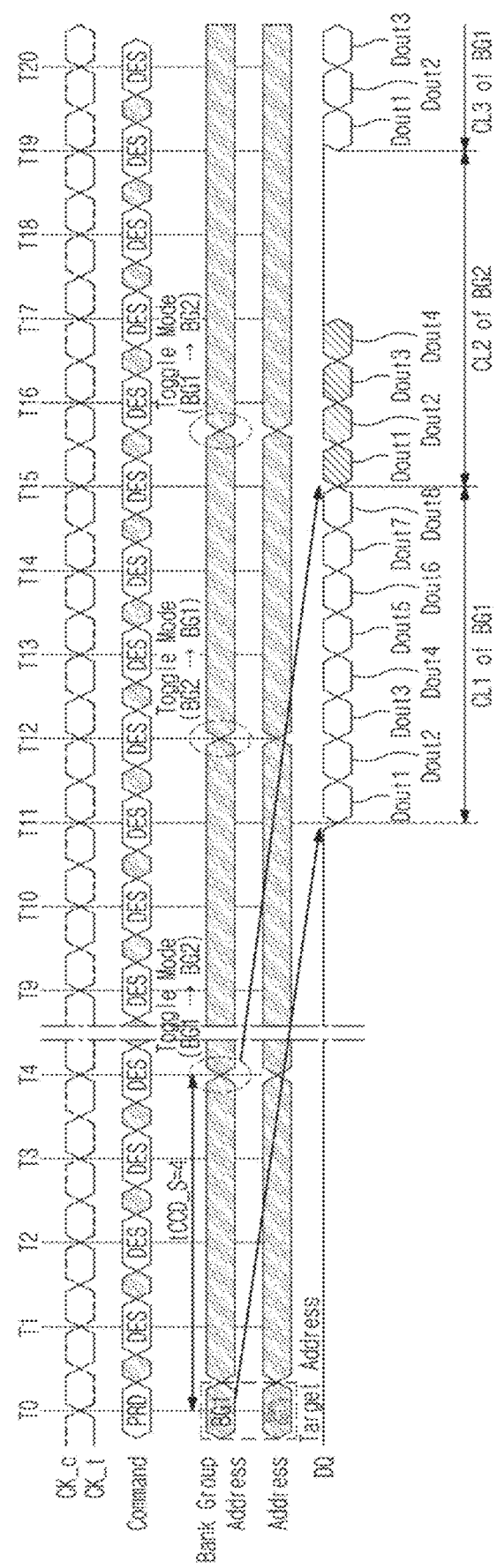

FIG. 12B is a diagram illustrating another example of a single prefetch read operation supporting consecutive read operations for different bank groups, according to some embodiments. For example, in FIG. 12B, the DDR4 may be supported, the burst length BL may be 8, the second access time tCCD_S may be 4, and the read latency 'RL' may be 11. Meanwhile, although not illustrated, 1tCK or 2tCK may be applied to the preamble. The single prefetch read operation of FIG. 12A and the single prefetch read operation of FIG. 12B are similar to each other. Therefore, for the sake of brevity, additional descriptions will be omitted below to avoid redundancy.

The single prefetch read operation of FIG. 12B may support On The Fly (OTF) mode. For example, in the read operation for the first bank group BG1, data corresponding to the burst length BL of 8 may be read, and in the read operation for the second bank group BG2, data corresponding to a burst chop BC of 4 may be read. For example, data for the first bank group BG1 may be read at times T11 to T15, and data for the second bank group BG2 may be read at times T15 to T17.

Since the read latency RL is 11 and the second access time tCCD_S is set to 4, after the data corresponding to the burst chop BC of 4 is read, the data may be not read or the dummy data may be read. For example, data may not be read or dummy data may be read at times T17 to T19.

In this case, data read at times T11 to T15 may correspond to the first cache line CL1 of the cache memory 1220, and data read at times T15 to T19 may correspond to the second cache line CL2 of the cache memory 1220.

In this way, the single prefetch read operation according to some embodiments may support a Read (BL8) to Read (BC4) OTF mode for different bank groups.

Figure 12C:
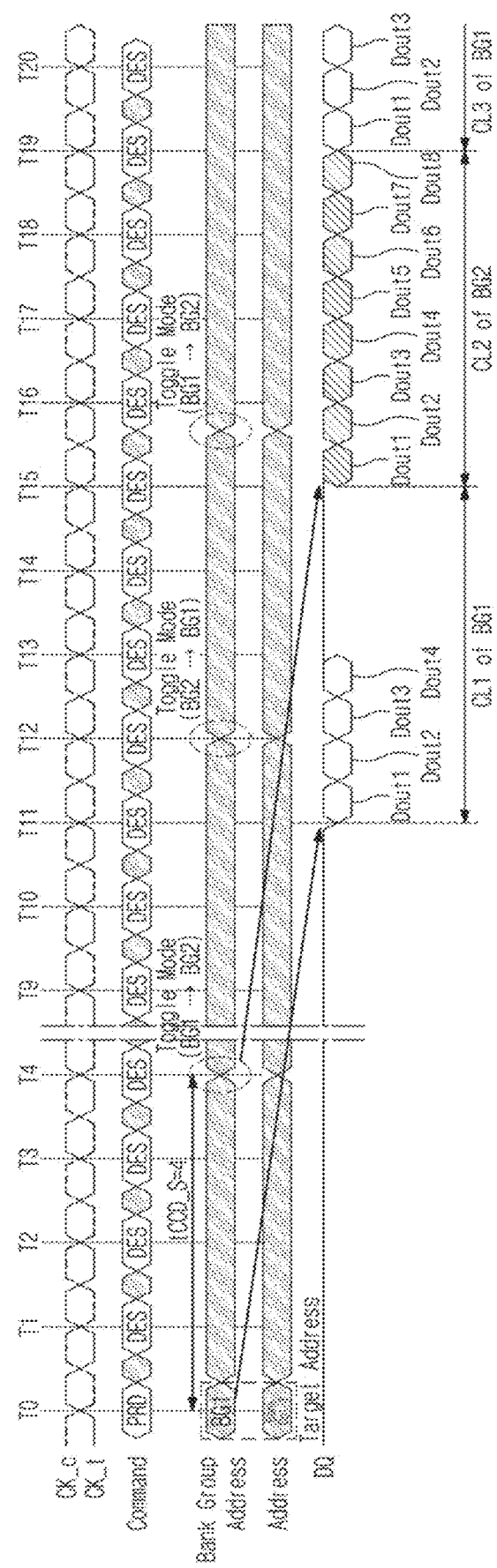

FIG. 12C is a diagram illustrating another example of a single prefetch read operation supporting consecutive read operations for different bank groups, according to some embodiments. For example, in FIG. 12C, the DDR4 may be supported, the burst length BL may be 8, the second access time tCCD_S may be 4, and the read latency 'RL' may be 11. Although not illustrated, 1tCK or 2tCK may be applied to the preamble. The single prefetch read operation of FIG. 12C and the single prefetch read operation of FIG. 12B are similar to each other. Therefore, for the sake of brevity, additional descriptions will be omitted below to avoid redundancy.

While the single prefetch read operation of FIG. 12B supports the Read (BL8) to Read (BC4) OTF mode, the single prefetch read operation of FIG. 12C may support a Read (BC4) to Read (BL8) OTF mode.

For example, data for the first bank group BG1 may be read at times T11 to T13, and data for the second bank group BG2 may be read at times T15 to T19. Data may not be read or dummy data may be read at times T13 to T15. In this case, data read at times T11 to T15 may correspond to the first cache line CL1 of the cache memory 1220, and data read at times T15 to T19 may correspond to the second cache line CL2 of the cache memory 1220.

In this way, the single prefetch read operation according to some embodiments may support the Read (BC4) to Read (BL8) OTF mode for different bank groups.

Figure 12D:
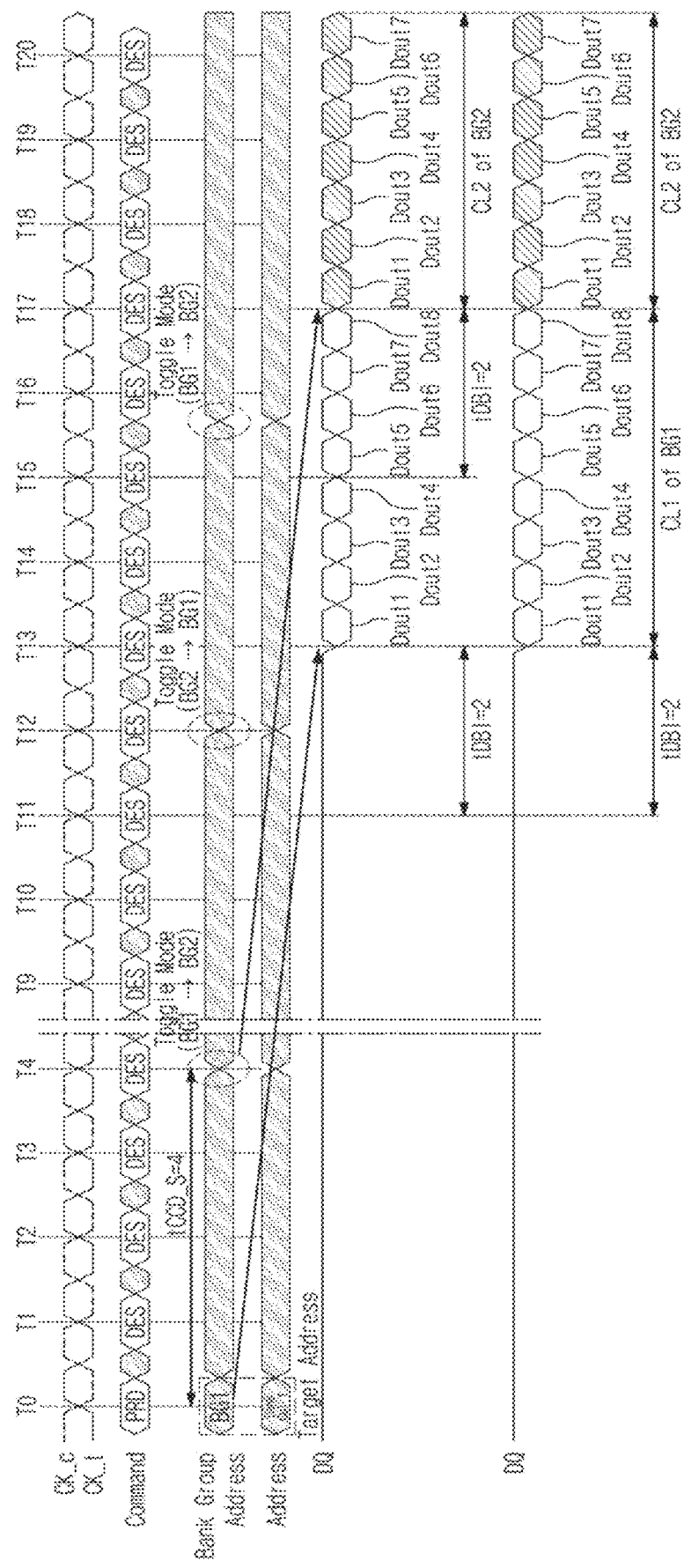

FIG. 12D is a diagram illustrating another example of a single prefetch read operation supporting consecutive read operations for different bank groups, according to some embodiments. For example, in FIG. 12D, the DDR4 may be supported, the burst length BL may be 8, the second access time tCCD_S may be 4, and the read latency 'RL' may be 11. Although not illustrated, 1tCK or 2tCK may be applied to the preamble. The single prefetch read operation of FIG. 12D and the single prefetch read operation of FIG. 12A are similar to each other. Therefore, for the sake of brevity, additional descriptions will be omitted below to avoid redundancy.

The single prefetch read operation of FIG. 12D may support a data bus inversion (DBI) mode. The DBI refers to a function of inverting and transmitting each data bit when the number of '0' in the data to be transmitted is greater than the number of '1' by taking advantage of the fact that power consumption is low when data of '1' is transmitted. For this, a DBI_n pin may be additionally provided. As such, the single prefetch read operation according to some embodiments may also support a DBI mode for different bank groups.

Figure 12E:
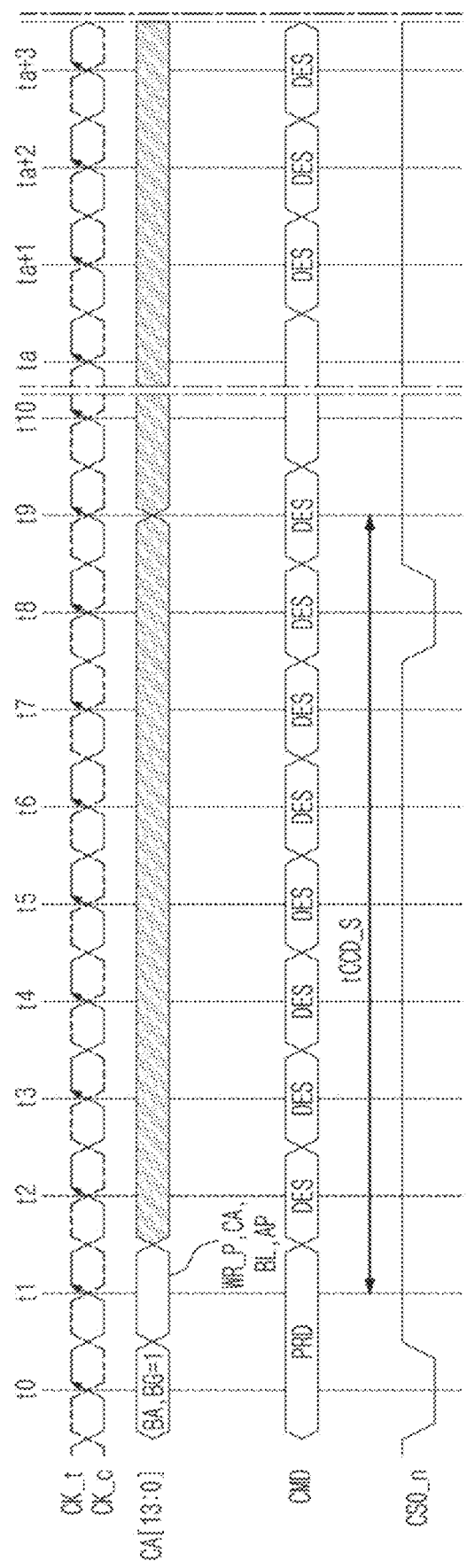

FIG. 12E is a diagram illustrating another example of a single prefetch read operation supporting consecutive read operations for different bank groups, according to some embodiments. For example, in FIG. 12E, the DDR5 may be supported, and the burst length BL may be 16. The single prefetch read operation of FIG. 12E and the single prefetch read operation of FIG. 12A are similar to each other. Therefore, for the sake of brevity, additional descriptions will be omitted below to avoid redundancy.

Referring to FIG. 12E, from time t0 to time t1, the single prefetch read command PRD may be provided to the storage module 1100 from the host 1200 through the CMD bus. In this case, at time t0, a target address may be provided together. The target address may include an address for the target bank group and an address for the target bank. A read operation with respect to the first bank group BG1 may be performed based on the prefetch read command PRD and the target address.

When the second access time tCCD_S elapses, the target bank group may be changed from the first bank group BG1 to the second bank group BG2. Thereafter, a read operation on the second bank group BG2 may be performed.

In each of the first bank group BG1 and the second bank group BG2, data may be read in a column stride scheme. In this way, the single prefetch read operation according to some embodiments may also be applied to the DDR5.

Figure 12F:
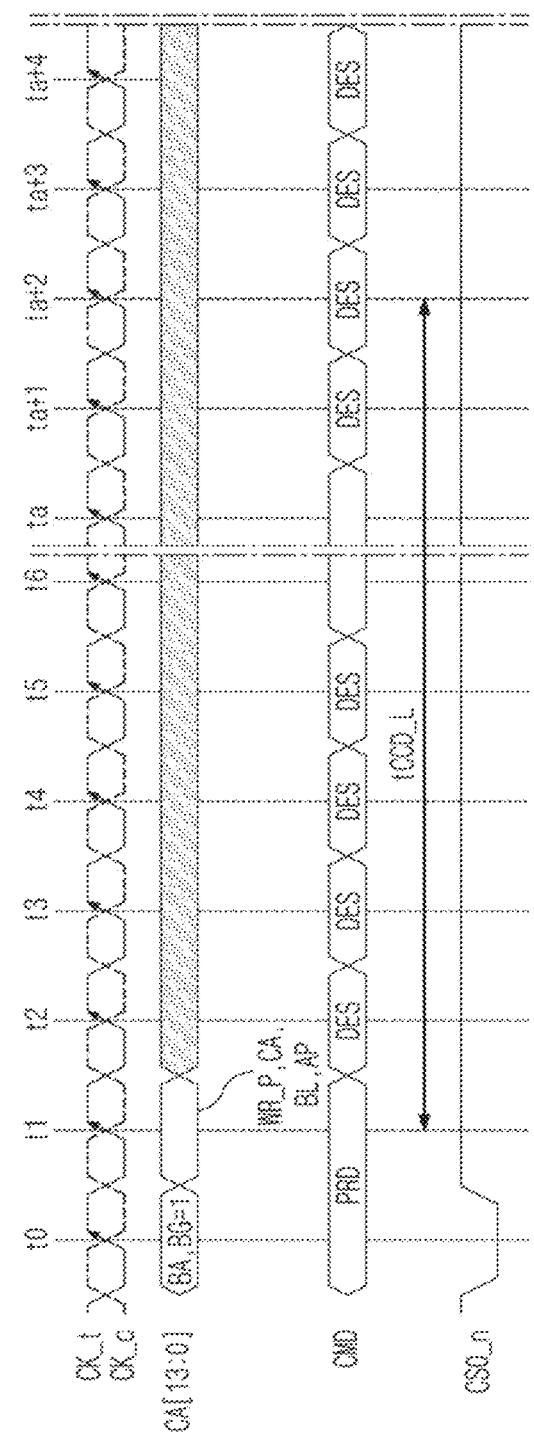

FIG. 12F is a diagram illustrating another example of a single prefetch read operation supporting consecutive read operations for a same bank group, according to some embodiments. For example, in FIG. 12F, the DDR5 may be supported, and the burst length BL may be 16. The single prefetch read operation of FIG. 12F and the single prefetch read operation of FIG. 12E are similar to each other. Therefore, for the sake of brevity, additional descriptions will be omitted below to avoid redundancy.

Unlike FIG. 12E in which read operations are performed on different bank groups, the read operation of FIG. 12F may be performed on banks of a same bank group. For example, when the toggle mode TM is disabled, a read operation for a single bank group may be performed.

In this case, consecutive read operations for the same bank group may be performed based on a pulse width corresponding to the first access time tCCD_L. The first access time tCCD_L may be set longer than the second access time tCCD_S of FIG. 12E, by way of example. In some embodiments, the order of the read operation for the selected bank group may be performed in a column stride scheme.

As such, the single prefetch read operation according to some embodiments may be applied to the same bank group.

Figure 13:
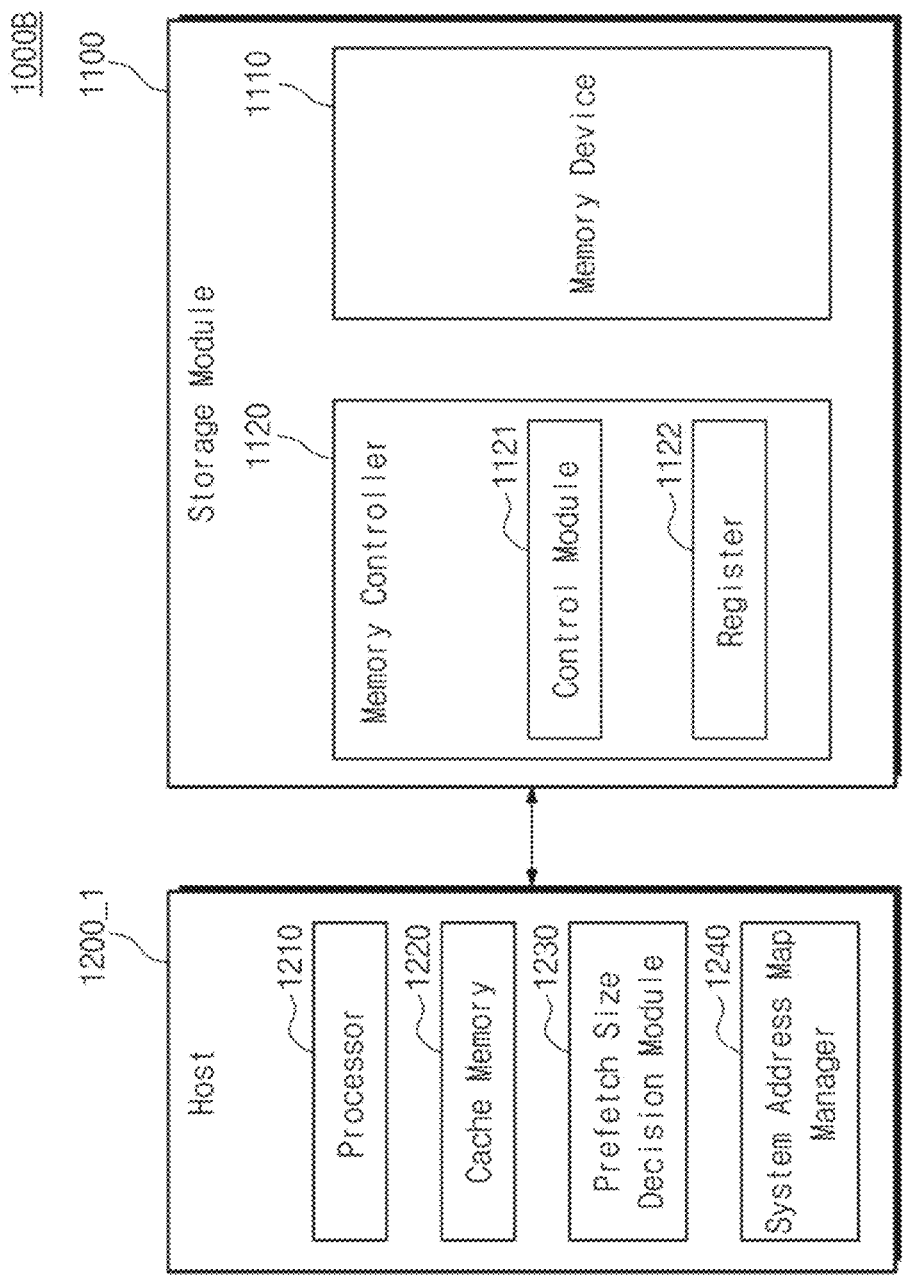
FIG. 13 is a block diagram illustrating an example of a memory system according to some embodiments.

FIG. 13 is a block diagram illustrating an example of the memory system 1000B, according to some embodiments.

The memory system 1000B of FIG. 13 is similar to the memory system 1000A of FIG. 1. Accordingly, the same or similar components are denoted using the same or similar reference numerals, and additional descriptions will be omitted below to avoid redundancy.

Referring to FIG. 13, the memory system 1000B may include the storage module 1100 and a host 1200_1. The host 1200_1 includes the processor 1210, the cache memory 1220, the prefetch size decision module 1230, and a system address map manager 1240, and the storage module 1100 includes the memory device 1110 and the memory controller 1120.

Compared to the memory system 1000A of FIG. 1, the memory system 1000B of FIG. 13 may further include the system address map manager 1240. The system address map manager 1240 may configure a system address map. The system address map manager 1240 may interpret data received from the storage module 1100 with reference to the system address map. Accordingly, accurate interpretation with respect to the data received from the storage module 1100 is possible, and thus the overall performance of the memory system 1000B may be improved.

Figure 14:
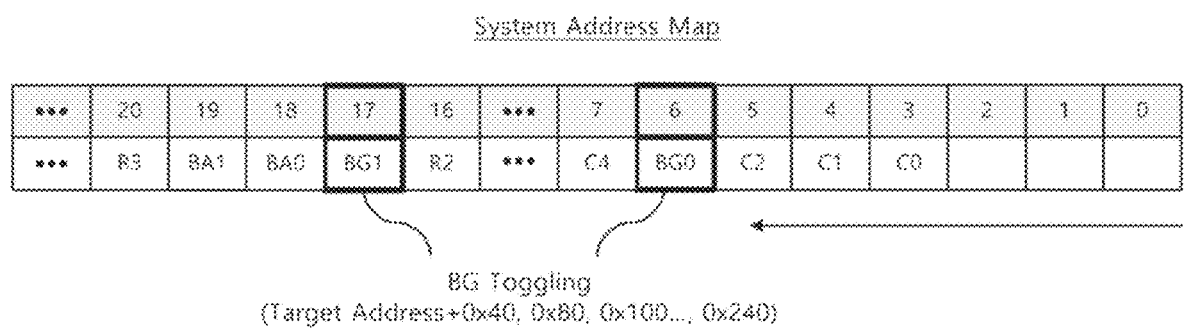
FIG. 14 is a diagram illustrating an example of a system address map configured by a system address map manager, according to some embodiments.

FIG. 14 is a diagram illustrating an example of a system address map configured by the system address map manager 1240, according to some embodiments. FIG. 14 illustrates a system address map corresponding to a single prefetch read operation with respect to different bank groups.

Referring to FIG. 14, the system address map may be sequentially configured from right to left along the column stride direction. In some embodiments, to reflect that the bank groups BG are alternately selected based on size of the cache line CL or the second access time tCCD_S in the memory device 1110, the system address map also may indicate that the bank groups are alternately selected based on the size of the cache line CL or the second access time tCCD_S. For example, it is assumed that the size of the cache line CL is 64 bytes, and 10 read operations are consecutively performed in the storage module 1100. In this case, the system address map may be configured to indicate that the bank groups are changed at a target address, the target address+0x40, the target address+0x80, the target address+0xC0, the target address+0x100, the target address+0x140, the target address+0x180, the target address+0x1C0, the target address+0x200, the target address+0x240.

As such, the system address map includes information on the address of the data received from the storage module 1100, and accordingly, accurate interpretation of the data received from the storage module 1100 is possible, such that overall performance of the memory system 1000B may be improved.

According to some embodiments, the storage module may prevent the occurrence of a read to read gap by dynamically determining the size of data to be prefetched according to a workload and transmitting only one prefetch read command. Accordingly, the performance of a memory system may be improved.

The above descriptions are specific embodiments for carrying out the present disclosure. Embodiments in which a design is changed simply or which are easily changed may be included in the present disclosure as well as an embodiment described above. In some embodiments, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method comprising:
setting a characteristic value by identifying information on a prefetch size and a toggle mode related to a plurality of bank groups, based on a setting command received from a host;
generating control signals based on a number of read operations indicated by the identified information on the prefetch size, and based on the information on the toggle mode; and
performing the number of read operations consecutively on a storage module in units of cache lines based on the control signals in response to one prefetch read command received from the host.

2. The method of claim 1, wherein performing the number of read operations consecutively comprises:
performing the number of read operations consecutively with respect to different bank groups among the plurality of bank groups, based on an access time.

3. The method of claim 2, wherein performing the number of read operations consecutively with respect to the different bank groups comprises:
reading data corresponding to a size of a cache line with respect to a first bank group of the plurality of bank groups; and
reading data corresponding to the size of the cache line with respect to a second bank group of the plurality of bank groups that is different from the first bank group, at an interval of the access time.

4. The method of claim 3, wherein the read operation with respect to the first bank group and the second bank group is sequentially performed in one direction based on a column stride scheme.

5. The method of claim 2, wherein performing the number of read operations consecutively with respect to the different bank groups comprises:
reading data of a first size with respect to a first bank group of the plurality of bank groups; and
reading data of a second size less than the first size with respect to a second bank group of the plurality of bank groups that is different from the first bank group, at an interval of the access time, and
wherein the first size is a same size as a size of a cache line.

6. The method of claim 2,
wherein performing the number of read operations consecutively with respect to the different bank groups comprises:
reading data of a first size with respect to a first bank group of the plurality of bank groups; and
reading data of a second size greater than the first size with respect to a second bank group of the plurality of bank groups that is different from the first bank group, at an interval of the access time, and
wherein the second size is a same size as a size of a cache line.

7. The method of claim 1, wherein performing the number of read operations consecutively comprises:
performing the number of read operations consecutively with respect to banks of a same bank group based on an access time.

8. The method of claim 1, wherein the one prefetch read command is implemented using only one bit.

9. The method of claim 1, wherein the characteristic value includes a characteristic value related to the number of the read operations to be consecutively performed.

10. The method of claim 9, wherein the characteristic value includes a characteristic value related to whether the read operation is to be performed on a same bank group of a plurality of bank groups, or whether the read operation is to be performed on different bank groups of the plurality of bank groups.

11. The method of claim 1, wherein the information on the prefetch size is transferred from the host through a mode register set (MRS) command or a mode register write (MRW) command, and wherein, during an update delay time for setting the characteristic value, a non-setting command is not transmitted from the host.

12. A storage module comprising:
a memory device including a volatile memory; and
a memory controller configured to control the memory device, and
wherein the memory controller includes:
 a control module configured to decode a setting command received from a host to identify information on a prefetch size, and to determine a number of read operations based on the prefetch size; and
 a register configured to store information on the number of read operations,
wherein the memory device includes a plurality of bank groups,
wherein the control module decodes the setting command to identify information on a toggle mode related to the plurality of bank groups,
wherein the register stores the information on the toggle mode,
wherein the control module outputs a control signal for performing the read operations on the memory device based on one prefetch read command received from the host, and
wherein the control signal is generated based on the information on the number of read operations and the information on the toggle mode.

13. The storage module of claim 12, wherein, when the toggle mode is enabled, the memory device alternately performs the read operations on different bank groups of the plurality of bank groups, based on the control signal.

14. The storage module of claim 13, wherein the read operations for each of the different bank groups are performed based on a column stride scheme.

15. The storage module of claim 12, wherein, when the toggle mode is disabled, the memory device consecutively performs the read operations on banks of a same bank group of the plurality of bank groups, based on the control signal.

16. A memory system comprising:
a host configured to determine a number of cache lines to be prefetched into a cache memory; and
a storage module including a volatile memory, and configured to receive a setting command comprising information on the number of cache lines from the host, determine a number of read operations based on the number of cache lines and based on information on a toggle mode related to a plurality of bank groups,
wherein the storage module is further configure to generate control signals based on the number of read operations and the toggle mode, and
wherein the storage module consecutively performs the read operations in units of the cache lines based on the control signals in response to one prefetch read command received from the host.

17. The memory system of claim 16, wherein the host includes:
a processor;
a cache memory allocated to the processor; and
a prefetch size decision module configured to determine the number of cache lines to be prefetched based on a workload to be performed by the processor.

18. The memory system of claim 17, wherein the host further includes:
a system address map manager configured to manage address information associated with data received from the storage module.

* * * * *